G. P. GIBSON.
ORE SMELTING FURNACE.
APPLICATION FILED AUG. 6, 1914.
1,138,651.
Patented May 11, 1915.
3 SHEETS—SHEET 1.
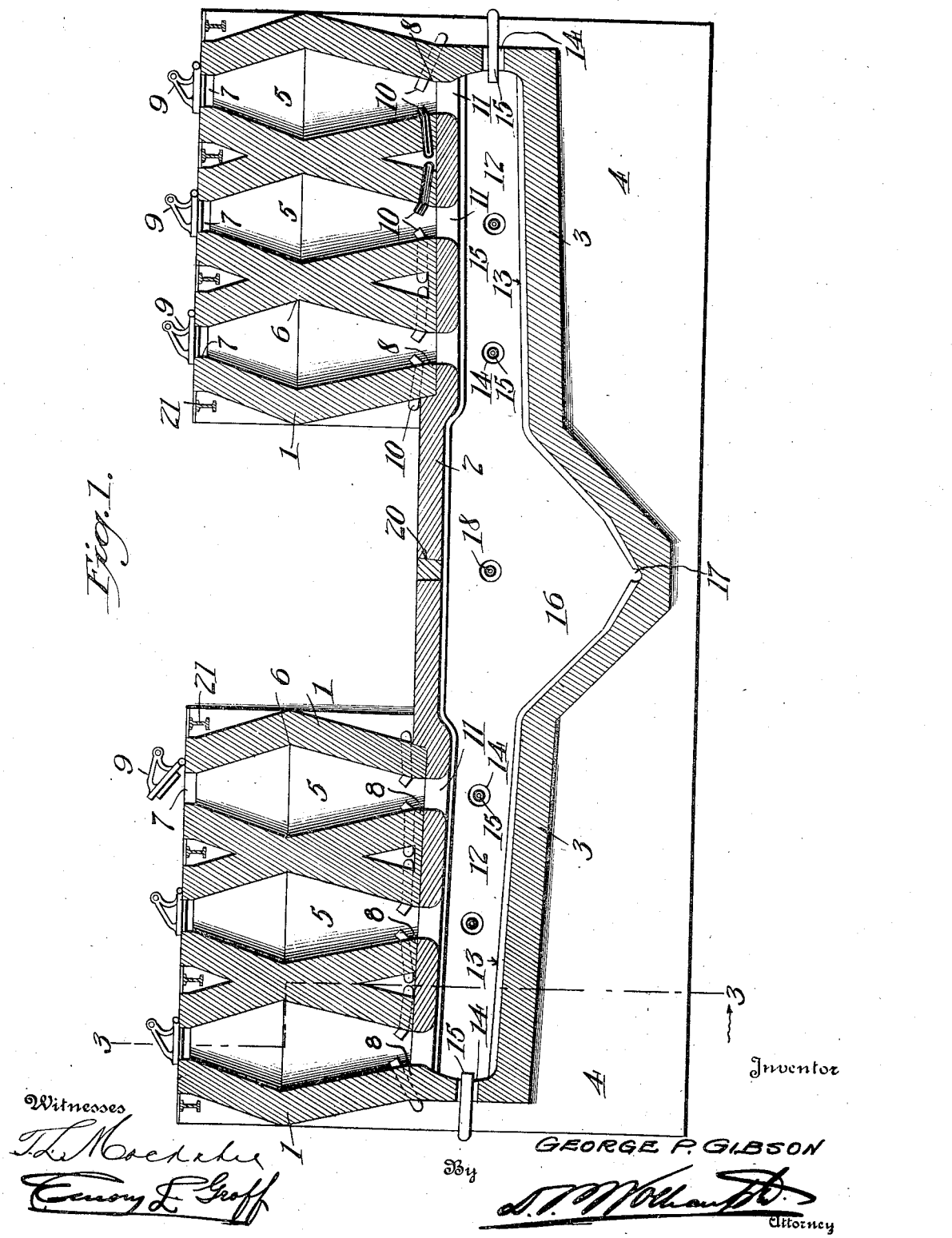
Witnesses
Inventor
GEORGE P. GIBSON
By
Attorney G. P. GIBSON.
ORE SMELTING FURNACE.
APPLICATION FILED AUG. 6, 1914.
1,138,651.
Patented May 11, 1915.
3 SHEETS—SHEET 2.
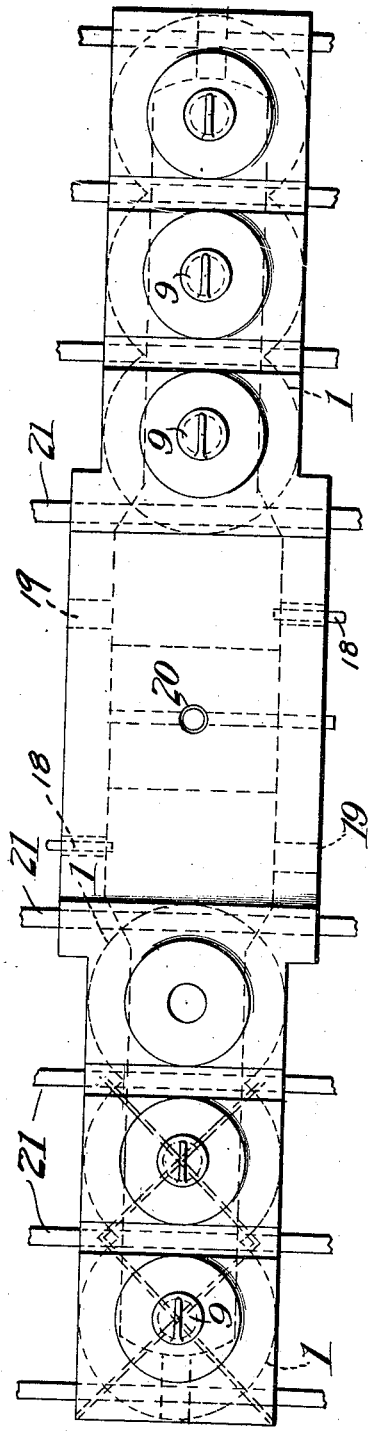
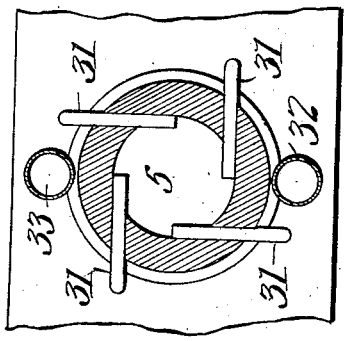
Witnesses
Inventor
GEORGE P. GIBSON
By
Attorney

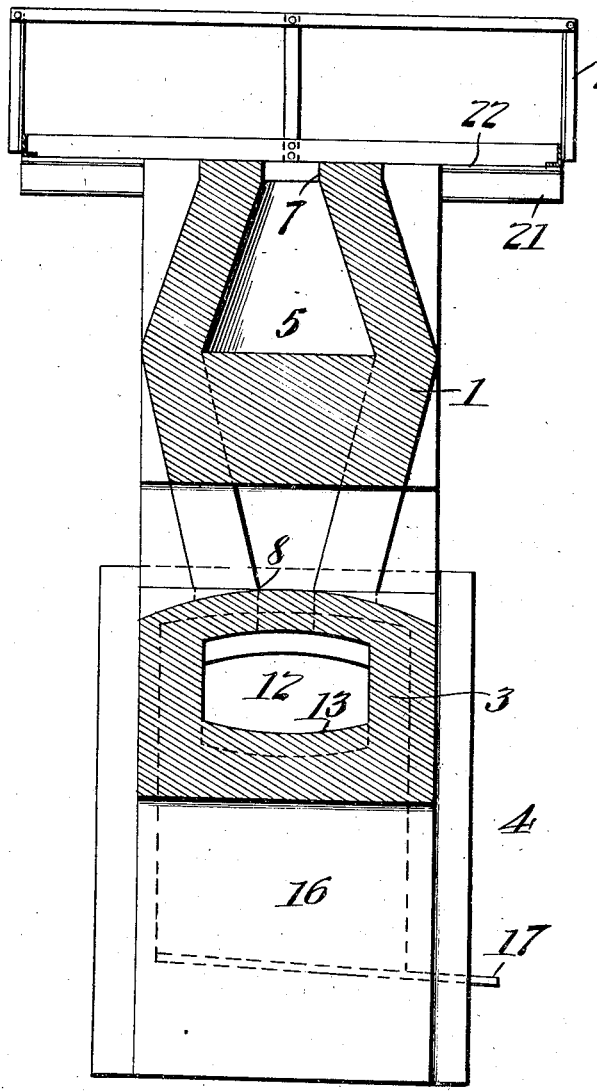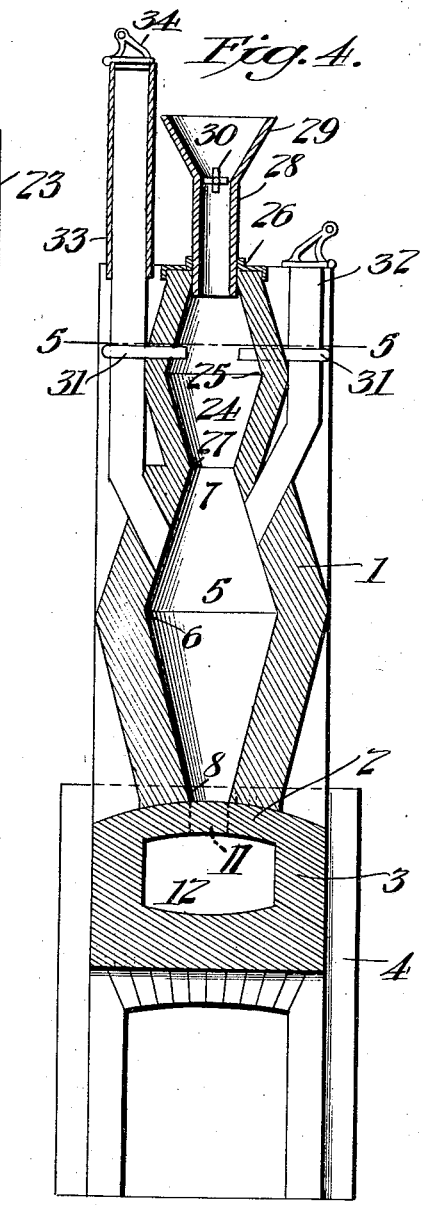

UNITED STATES PATENT OFFICE.

GEORGE P. GIBSON, OF BRADDOCK, PENNSYLVANIA.

ORE-SMELTING FURNACE.

1,138,651.  Specification of Letters Patent.  Patented May 11, 1915.

Application filed August 6, 1914. Serial No. 855,433.

*To all whom it may concern:*

Be it known that I, GEORGE P. GIBSON, a citizen of the United States, residing at Braddock, in the county of Allegheny and State of Pennsylvania, have invented certain new and useful Improvements in Ore-Smelting Furnaces, of which the following is a specification.

This invention relates to the subject of smelting furnaces, and has particular reference to a novel and improved construction of that type generally employed for the smelting and reduction of ore, being especially designed for use in connection with iron and lead ores.

One of the objects of the present invention is to provide a smelting furnace which embodies novel features of construction whereby the heat of combustion is utilized to a maximum extent in reducing and melting the ore. That is to say, the construction of the present invention admits of a series of comparatively small charges of ore to be arranged so that the smelting heat is effective in the highest possible degree, and acts in a more satisfactory and efficient manner than is possible in the ordinary smelting or blast furnace where a single large charge is treated and the products of combustion circulate upwardly through the charge and collect at the top and cooler portion thereof.

Another object of the invention is to provide a novel arrangement of smelter units in connection with a melting furnace which is common to the discharge openings of all of the smelter units and which is not only adapted to keep the metal reduced from the ore in a thoroughly molten condition so that it may be easily collected and drawn off, but at the same time aids in the extraction of sulfur and phosphorus from the molten mass, thus resulting in obtaining a standard and fine grade of metal available for the production of steel.

With the above and other objects in view which will more readily appear as the nature of the invention is better understood, the same consists in the novel construction, combination, and arrangement of parts hereinafter more fully described, illustrated, and claimed.

A preferred and practical embodiment of the invention is shown in the accompanying drawings, in which—

Figure 1 is a longitudinal sectional view. Fig. 2 is a top plan view of the construction shown in Fig. 1. Fig. 3 is a transverse section taken on the line 3—3 of Fig. 1. Fig. 4 is a transverse sectional view of a modified form of the invention particularly designed for recovering metal from downcomer dust. Fig. 5 is a cross sectional view on the line 5—5 of Fig. 4.

Similar reference characters designate corresponding parts throughout the several figures of the drawings.

With particular reference to the embodiment of the invention disclosed in the several figures of the accompanying drawings, it will be observed that the same includes a plurality of individual smelting-furnace units 1 which are preferably grouped in battery formation on the top wall 2 of a melting furnace 3 which includes the furnace casing 4 as clearly shown in the drawings.

According to the preferable and practical arrangement shown in the drawings, separate batteries or sets of the smelter furnace units are arranged in separate or opposite locations, with each set or battery of units in communication with its own melting furnace or muffler 3, while both melting furnaces or mufflers are in open communication with each other and also with a common molten metal pit. In this connection, it will be obvious that any desired number of the furnace units may be grouped in each battery or set thereof, and also the number of batteries multiplied to any extent without affecting the practical feature of grouping together a number of smelter furnace units in battery formation, and having the units of each battery communicate with a melting furnace or muffler which in turn communicates with a common reservoir or pit for receiving the molten metal and maintaining it in molten condition ready to be converted into steel by any of the conventional steel processes.

Each of the smelter furnace units 1 is of substantially the design of the conventional blast furnace, that is to say, each furnace unit is constructed of a masonry body having an internal ore chamber 5 which is bellied or enlarged at its central portion, as at 6, and is provided with an upper contracted receiving ore neck 7 and a lower contracted metal discharge throat 8. The receiving neck 7 of the furnace units are closed by hinged covers or lids 9, while the lower contracted discharge throats 8 thereof are adapted to receive therein heat producing means preferably in the form of burners 10 which are disposed upwardly within the said throats 8 and may be operated by gas or oil fuel. These burners are preferably of the type involving an inner burner tube 10<sup>a</sup> for the gas or oil fuel, and an outer blast tube 10<sup>b</sup> surrounding the inner tube 10<sup>a</sup> and designed to direct a blast of steam into the furnace unit in connection with the gas or oil flame, thereby producing smelting conditions for melting the metal out of its ore. However, as this is only the preferable heat producing means employed in connection with the individual smelter units, it will of course be understood that I do not limit my invention thereto but reserve the right to employ other equivalent heat producing means for maintaining a smelting heat within and throughout the units, and particularly within the contracted discharge throats 8, through which the molten metal passes to the melting furnace or muffler 3.

The discharge throats of the smelter furnace units of each battery or set thereof are in communication through the ports 11 with the muffler chamber 12 of the melting furnace 3. The bottom wall or floor of the said chamber 12 is in the form of an inclined melting hearth 13, while the side walls of the chamber are provided with suitable openings 14 for receiving fuel burners 15, which are adapted to play upon the metal dropping from the smelter furnace units and keep it into a thoroughly molten condition, so that it will pass out of the muffler chamber 12 because of the inclination of the melting hearth into a molten metal-collecting pit 16. In this connection, it will be observed that there is a sufficient number of fuel burners 15 in communication with each muffler chamber 12 to fill the latter throughout with a hot flame that keeps the hearth 13 in a highly heated condition, as well as serving to melt any of the ore which may drop through the ports 11 in an unsmelted condition.

At the bottom, the molten metal pit 16 is provided with a suitable draw-off tap 17, and is maintained continuously in a highly heated condition by means of fuel burners 18 entering the walls thereof, within its top portion, said burners or other equivalent heat producing means serving to maintain a hot flame within and throughout the top portion of the pit over the body of molten metal therein. Also, the said molten metal pit is further provided with a cinder door 19 which enables the operators to remove the cinder and slag from the top of the molten metal, and a vent opening 20 is provided in the top wall 2 of the said pit over the molten metal for the purpose of releasing, if necessary, the hot gases caused by the melting operation.

From the foregoing description, it will be apparent that the ores may be placed in the chambers 5 of the smelting units, and the burners 10 lighted so that a reduction of the ore takes place and the metal obtained therefrom by the smelting operation drops onto the inclined melting hearth 13 where it is played upon by the burners 15 and kept in a highly molten condition, so that it will freely run down the inclined surface of the melting hearth into the molten metal pit. As the metal drops from the smelting furnaces into the muffle chamber, it is exposed to the intense heat of opposite burners which are arranged so that their flames are disposed directly under the ports 11 in the top of the melting furnace. Thus, the molten metal is caused to spread out upon the melting hearth so that practically every particle thereof is subject to the heat of the burners, thereby extracting the sulfur and phosphorus from the metal and resulting in a finer grade of metal collected in the pit 16. These advantages are only made possible by the present construction which provides that the ore shall be subjected to smelting heat in comparatively small quantities, and in such a manner that the ore in the bottom of the furnace gradually becomes reduced, and at the same time preliminarily reduces the ore in the upper part of the chamber. Further, the present arrangement of burners in the discharge throat of each smelting furnace thoroughly reduces the ore so that a maximum amount of metal is extracted therefrom by the time it is discharged onto the melting hearth for the further action of the burners 16. In this way, the ore is not treated in great masses or quantities which prevent the proper and thorough reduction often encountered.

The masonry top portions of the batteries of smelting furnace units have embedded therein, the transverse reinforcing I-beams 21 upon which are constructed a supporting floor 22 and side walls 23 of a trackway for a larry or ore carrier to deposit into the units.

Figs. 4 and 5 of the drawings show a special adaptation of the present invention which is particularly advantageous for the melting of what is known as downcomer dust, this being the metal dust which is blown out of the ordinary blast furnaces, and which is now carefully recovered for subsequent use. With reference to the details of construction shown in Fig. 4, it will be observed that the same are substantially the same as shown in Figs. 1, 2, and 3 of the drawings, with the exception of the addition of an auxiliary smelter-unit 24. This smelter unit 24 is of the same design as the smelter units 1, having the enlarged central portion 25, and a contracted receiving neck 26, and a contracted discharge throat 27 which latter registers with the receiving neck 7 of the smelter unit 1. The receiving neck 26 of the said preliminary smelter has fitted therein a chute 28 having at its upper end a flared hopper 29 into which the downcomer dust is emptied and fed into the preliminary smelter by means of a suitable agitator 30 arranged at the junction of the hopper and the chute. Similar to the other smelter units, the unit 24 is provided with blast jets 31 which are tangentially arranged, as best observed from Fig. 5, so that when in action a whirling effect is produced which provides an eddy or whirlpool of flame that effectively heats every particle of metal in the downcomer dust.

It is the intention to use the smelter unit 24 in connection with the usual form of the apparatus shown in the main figures of the drawings, and to this end there is provided a feed chute 32 through which ore may be fed into the chamber 5 of the smelter unit 1. On the opposite side of the smelting furnace 1, there is provided a suitable vent or stack 33 which communicates with the interior of the smelter unit, and is provided at its outer end with a hinged valve or cover member 36. Thus, it will be apparent that the utilization of a preliminary smelting furnace for the downcomer dust is possible in connectin with the smelting and melting of the ordinary ore.

In view of the foregoing, it is thought that the primary feature of the present invention, namely that of arranging the ore to be reduced in small quantities in such a manner that it receives the maximum effect of the reducing heat, and then melting the molten metal as it drops from the smelting furnaces onto a melting hearth will be readily apparent without further description. However, it will be understood that various changes in the minor details of construction, and especially the utilization of the invention in a modified form to increase its capacity and out-put, may be resorted to without departing from the spirit of the invention or the scope of the appended claims, and without sacrificing any of its advantages.

I claim:

1. A smelting furnace including an inclosed melting furnace having a muffler chamber and a molten metal pit in communication with said chamber, an upright smelting furnace unit having a contracted discharge throat at its lower end opening into the top of said muffler chamber, and separate heating means respectively for the said heating unit and the said muffler chamber.

2. A smelting furnace including a plurality of smelter furnace units, an inclosed melting furnace arranged beneath said smelter units and adapted to receive the discharge therefrom, and separate heating means respectively for each of said units and for the melting furnace.

3. A smelting furnace including a plurality of independent smelting blast furnace units, each of said units having an enlarged central ore chamber and at the bottom formed with a contracted discharge throat, heating means in the contracted discharge throat portion of each of said furnace units, a single melting furnace common to all of said blast furnace units and arranged beneath the throat portions thereof, and separate heating means for the melting furnace.

4. A smelting furnace including a plurality of independent smelting blast furnace units each having at its lower end a contracted discharge throat, heating means in the contracted discharge throat of each furnace unit, a melting furnace having a muffle chamber in communication with the discharge throat of the smelter units, a molten metal pit for receiving molten metal from the muffle chamber, and separate heating means for the melting furnace.

5. A smelting furnace including a melting furnace, a plurality of independent smelting blast furnace units arranged in battery formation on said melting furnace, said melting furnace having inclined melting hearths arranged beneath the discharge openings of the smelter units, a central molten metal pit between said inclined hearths, heating means for said units, and other heating means in proximity to and over said hearths.

6. A smelting furnace comprising in combination, separate batteries of smelting blast furnace units, the units of each battery having contracted discharge throats at their lower ends, an inclosed melting furnace supporting each battery of units and having inclined melting hearths arranged beneath and spaced from the discharge throats of said units, a common molten metal receiving pit, heating means in the discharge throat of each unit, and other heating means for the melting furnace.

7. A smelting furnace including an inclosed melting furnace having a muffler chamber and a molten metal pit, an upright smelting furnace unit in communication at its lower end with the muffler chamber, an auxiliary smelter unit surmounting said other unit and in direct communication therewith, and separate heating means respectively for the muffler chamber, for the smelter unit and for the said auxiliary smelter unit.

8. A smelting furnace including an inclosed melting furnace having a muffler chamber, and a molten metal pit, an upright smelting furnace unit in communication at its lower end with the muffler chamber, an auxiliary smelter unit surmounting said other unit and in direct communication therewith, heating means arranged within said auxiliary smelter unit to produce a whirling flame, and separate heating means for the upright smelting furnace and for the melting furnace.

9. A smelting furnace including an inclosed melting furnace having a muffler chamber, and a molten metal pit, an upright smelting furnace unit in communication at its lower end with the muffler chamber, an auxiliary smelter unit surmounting said other unit and in direct communication therewith, a plurality of tangentially arranged burner elements opening into the auxiliary smelter unit, and separate heating means respectively for the upright smelter furnace unit and for the melting furnace.

In testimony whereof I hereunto affix my signature in the presence of two witnesses.

GEORGE P. GIBSON.

Witnesses:
J. K. FISHER,
S. H. BEAM.